United States Patent [19]

Stiles

[11] Patent Number: 5,176,888
[45] Date of Patent: Jan. 5, 1993

[54] ACID RAIN ABATEMENT

[75] Inventor: Alvin B. Stiles, Wilmington, Del.

[73] Assignee: University of Delaware, Newark, Del.

[21] Appl. No.: 694,085

[22] Filed: May 1, 1991

Related U.S. Application Data

[62] Division of Ser. No. 498,539, Mar. 26, 1990, Pat. No. 5,023,063.

[51] Int. Cl.$^5$ .......................... B01J 8/00; C01B 21/00; C01B 17/00; C01B 17/02
[52] U.S. Cl. ..................... 423/239; 423/576; 423/244.09
[58] Field of Search .................. 423/242 A, 243, 555, 423/576, 564, 244 R, 239

[56] References Cited

U.S. PATENT DOCUMENTS

| | | | |
|---|---|---|---|
| 4,012,488 | 3/1977 | Brocoff | 423/564 |
| 4,147,763 | 4/1979 | McKinzie et al. | 423/564 |
| 4,263,020 | 4/1981 | Eberly | 423/244 |
| 4,830,840 | 5/1989 | Bhattacharyya | 423/244 |

*Primary Examiner*—Gregory A. Heller
*Attorney, Agent, or Firm*—Connolly & Hutz

[57] ABSTRACT

The process of this invention will remove acid rain precursors, sulfur oxides (SOX) and nitrogen oxides (NOX) by catalytically reducing the NOX to water and elemental nitrogen and the SOX to either $H_2S$ or elemental sulfur as desired. The process employs specific catalysts in the heteropoly acid or salt group and the spinel or inverse spinel group. The process conditions achieve an oxygen-free environment and reduction is effected with stoichiometric to 100% excess above stoichiometric $H_2$ or $H_2$ and CO as reducing gas. Temperatures can be 200° to 900° C. with the lower temperature range being favored space velocity can be 2000 to 20,000 and still achieve 95+% abatement. The only product of the reaction which must be disposed of is saleable elemental sulfur.

25 Claims, No Drawings

ACID RAIN ABATEMENT

CROSS REFERENCE TO RELATED APPLICATION

This application is a divisional of Ser. No. 498,539, filed Mar. 26, 1991 now U.S. Pat. No. 5,023,063.

BACKGROUND OF INVENTION

Acid rain is attributable to the release of nitrogen oxides and sulfur oxides into the atmosphere. The nitrogen oxides (NOX) and sulfur oxides (SOX) are primarily derived from combustion processes such as petroleum in internal combustion engines of automobiles and from utilities which burn coal or high sulfur fuel oil in the furnaces of the steam-electric generating stations. Means have been devised and implemented for the abatement of NOX and SOX from automobile exhausts but the coalburning electric generating stations remain a severe domestic and international problem. Unlike petroleum, coal cannot be effectively desulfurized or denitrogenated. As a consequence, it is necessary to remove the NOX and SOX from the flue gas. There are scrubbing processes employing pulverized limestone or NaOH solution. In both cases there are severe disposal problems magnesium and calcium sulfate when lime is used and sodium sulfate when sodium hydroxide is used. Magnesium sulfate is Epsom Salt, a purgative, calcium sulfate forms a gel-like material presenting a severe problem of disposal. Sodium sulfate like any other soluble material would enter the aquifer and the river system as an objectionable contaminant.

In the United States there is burned in the generation of electrical energy over 660 million tons of coal per year with an average sulfur content estimated to be 2%. The burning of the coal produces sulfur dioxide and sulfur trioxide equivalent to approxi-mately 30 million tons of sulfuric acid and nitrogen oxides equivalent to approximately 6 million tons of nitric acid per year.

These acid gases enter the atmosphere and are in the course of being transported by the wind, exposure to sunshine, and moisture, converted to sulfuric and nitric acids and fall as acid rain. It is a well recognized but unsolved problem. It has been addressed by congress and has been the object of research efforts sponsored by the Department of Energy, Electric Power Research Institutes, and private utilities. As well as it being a national problem, it is also an international problem resulting from the effects that the acid rain has on architecture, statuary, lakes and vegetation. To date no satisfactory solution has been derived.

There are solutions, but they have many problems either because of high cost or incomplete or inadequate removal of the sulfur or nitrogen oxides. These processes fall into four different categories identified as follows:

First is simple washing of the coal. This is practiced on approximately 40% of the coal and removes a small percent of the sulfur but none of the nitrogen oxides. Furthermore, the washing operation introduces pollution into the waterways into which the wash water is discharged. It is probably the poorest and most incomplete of any of the possible solutions. The next process grouping is one in which the coal is in various ways mixed with pulverized limestone and the limestone during combustion on the furnace grate removes the sulfur as calcium or magnesium sulfates. A related process is to use an alkali carbonate instead of limestone. These processes are expensive, ineffective in removing the nitrogen oxides, only partially effective in removing the $SO_2$, and present extreme problems of disposal of the sulfate product. Additionally, the abrasiveness of the coal ash and the limestone is detrimental to the furnace components. Furthermore, it increases the load on the dust removal system, which are the cyclone separators and the electrostatic precipitators. The fourth process involves a wet slurry scrubber system in which a finely pulverized limestone, magnesium oxide or sodium hydroxide is used to scrub the boiler flue gas. This process in general has many of the same weaknesses of those already described, namely, failure to remove the nitrogen oxides and only partially effective in removing the SOX. The system is extremely corrosive and abrasive and as a consequence maintenance is extremely high. A related process has recently been announced as a result of laboratory scale tests. This process is very similar to the limestone slurry scrubbing, but adds an emulsion of yellow phosphorous to the scrubbing slurry. No cost figures were reported, but a rough approximation would classify this to be hazardous because of the elemental yellow phosphorous which is spontaneously combustible when dry and is extremely corrosive to the skin. These hazards are in addition to the other shortcomings of process such as abrasiveness and corrosiveness making for prohibitive maintenance costs.

It can be seen that none of the above remove in a single step the nitrogen oxides, and, as a consequence, the nitrogen oxide must be removed in separate operations such as the addition of ammonia and passing the nitrogen oxide-ammonium mixture over a precious metals catalyst or a titania vanadium oxide catalyst which reduces a portion of the nitrogen oxides. Here again, however, the removal of the nitrogen oxides is only about 76% or less complete.

SUMMARY OF THE INVENTION

In the process of the invention the shortcomings of the foregoing operations and processes are avoided. In this process the flue gas is first treated for the removal of the remaining oxygen. This is done by adding natural gas, methane, or other reducing agents, such as hydrogen, to the flue gas and reacting it in such a way that the oxygen is removed and residual-reducing gases remain. This effluent after the oxygen gas has been removed is then passed as is or with additional reducing gas over a catalyst novel to the invention whereby the nitrogen oxides are reduced to water and elemental nitrogen, and the sulfur oxides are reduced as preferred either to essentially 100% elemental sulfur or to essentially 100% $H_2S$. The flue gas at this point is then either processed to remove the elemental sulfur by cyclones, filters, and electrostatic precipitation or if the sulfur has been converted to hydrogen sulfide, the hydrogen sulfide is then scrubbed out by a suitable scrubbing medium also well known to the art and then regenerated in a concentrated form from the scrubbing media in an alkaline oxidizing operation which is well known in the sulfur removal art. The process has shown to be at least as cost effective as any of the foregoing existing procedures and gives promise of being even more cost effective than the most economical of the foregoing existing operations.

An additional advantage of the catalyst of the invention is that unlike the catalysts used presently in the SOX removal processes to convert the SOX to $H_2S$, the catalyst of the present invention does not require conversion to the sulfide before use or requires a lengthy break-in period before adequate SOX conversion is obtained. Particularly, the spinels CoO.Al$_2$O$_3$, NiO.Al$_2$O$_3$, as examples) do not require the formation of the sulfide except as a catalytic labile form. Such labile salts are, for convenience sake, identified as an oxy-sulfide indicating an ill-defined composition varying with temperature, sulfur content, hydrogen-partial pressure and other operating variables. Adequate sulfiding of the catalyst occurs immediately when the catalyst is put into service.

A still further advantage is that the catalysts can be mixed with water and an adhesive such as colloidal silica, ceria, and other colloids and titanium esters such as those marketed by DuPont Company under the trade name Tyzor. This mixture forms a paint-like film when applied and dried onto a smooth surface such as those of a ceramic or metallic honeycomb, rings, saddles or rods, as examples. This dried film is exceptionally catalytically active and when applied to the honeycomb ceramic forms a very active low pressure drop structure.

An additional advantage of this uniquely adherent film is that when the catalyst is used in a flue gas containing residual coal-ash dust, when the dust adheres to the catalytic surface and the catalytic effectiveness, because of the coating of dust, deteriorates to an unacceptable level, can be fully restored to "like new", by applying a simple water wash (simple immersion and removal) or an air blast. Such can be performed in place in the unit or after the catalyst was removed from the reactor as was done in the semi-works demonstration unit. The semi-works unit was being used to evaluate the catalyst in honeycomb form in a side stream reactor.

Teachings of U.S. Pat. No. 4,012,488 (Brocoff patent)

This patent describes a process having some similarities to the present invention but also having very significant and important differences.

The first important difference is between the catalysts as taught in Brocoff patent column four, lines 49–60. The following statement is given there describing the catalyst that is used:

Catalyst zone 30 contains one or more metals or their sulfides typically supported on an alumina, silica or an alumina-silica which are capable under reducing conditions of converting oxides of sulfur to hydrogen sulfide and the oxides of nitrogen to inert nitrogen and/or ammonia by respective reactions with hydrogen and water. Typical of the metals which may be employed are the Group VIII metals such as cobalt, nickel, rhodium palladium, iridium, and platinum as well as the lower sulfides and oxides of molybdenum and chromium, promoted aluminum oxides and the like.

The catalysts used are further identified in the three examples. In Example 1, Column 7, Lines 54–60, the catalyst is identified as follows: the hydrogen formed in the presence of supported cobalt molybdate catalyst in a catalyst zone inserted in the duct following the electrostatic precipitator reacts with the SO$_2$ and SO$_3$ to H$_2$S and water, and with the oxides of nitrogen to form nitrogen, water, and some ammonia to form a flue gas having the following composition shown in Table 3.

TABLE 3

| Constituent | % by Volume |
|---|---|
| CO | 0.05 |
| CO$_2$ | 15.68 |
| H$_2$ | 0.63 |
| H$_2$O | 10.65 |
| H$_2$S | 0.27 |
| N$_2$ | 72.72 |

In Example 2 the catalyst is rather loosely described as shown in Column 9, Lines 1–5 in which this statement is made: The flue gas, after mixture with the reducing gas, is then passed through a catalytic conversion zone where the oxides of sulfur are reduced to a concentration of less than 10 parts per million sulfur oxide and the oxides of nitrogen are essentially eliminated.

In Example 3 the catalyst begins rather briefly and rather incompletely as in Column 9, Lines 38–41 say "the combined gas stream is passed over a hydrogenation catalyst where the sulfur compounds present in the gas are reduced to the H$_2$S and the NOX is reduced to nitrogen and ammonia".

Similarly the catalysts are not well defined in the claims. Item D, for example, of Claim 1 says catalytically converting at least the contained oxides of sulfur to hydrogen sulfide and the oxides or nitrogen to nitrogen compounds selected from the group consisting of nitrogen, ammonia and the mixtures thereof by passing the cooled flue gas and a hydrogen containing reducing gas at temperatures 300°–800° F. through a catalytic conversion zone containing a catalyst capable of converting the oxides of sulfur to hydrogen sulfide and the oxides of nitrogen to nitrogen and ammonia. Claim 2 refers back to Claim 1 and, as a consequence, the catalyst employed has the same description as the catalyst of Claim 1, Claims 4, 5, 6, 8, 9, 10, 11, 12, 13, 14, 15 all refer back to Claim 1 and the minimal description of the catalyst contained therein.

Claim 7 identifies the catalyst more completely and Claim 7 is as follows:

A process as claimed in Claim 1 in which the catalyst contains a metal selected from the group consisting of cobalt, nickel, rhodium, palladium, iridium, platinum, molybdenum, and chromium, and mixtures thereof contained on a support selected from the group consisting of alumina, silica, alumina-silica and mixtures thereof.

It should be emphasized that reference in this patent as in every case describes a metal except for the support itself. It does not refer to the sulfide or oxide and, as a consequence, has no support in the specification which identifies molybdenum and chromium as lower sulfides and oxides of molybdenum and chromium promoted aluminum oxides and the like. No definition of what is meant by promoted aluminum oxide is given. Four major and very important differences exist between the catalysts and the process described by Brocoff and that of the present invention which will be defined more fully in the examples. These four differences are: one, in the present invention there are no elements as contrasted to oxides and salts such as cobalt, nickel, rhodium, palladium, iridium, and platinum which are in the present invention present either as oxides, sulfides or more likely as inter-reacted oxides forming heteropoly acids and/or spinels. The second difference is that the present invention does not generate the reducing gas by adding methane to the high temperature flue gas. The reasons for this are first that a flue gas effluent will be produced (because of the absence of oxygen) which will have smokey and unacceptable particulates resulting from incomplete combustion. The third difference is that in all cases Brocoff gives as one of his products after his hydrogenation reaction to be ammonia a part of the nitrogen oxides are hydrogenated to ammonia. This is what would be expected with the types of metallic catalysts he describes in Claim 7. Forming ammonia from the nitrogen oxide is in effect producing a contaminant which is essentially as objectionable as the nitrogen oxides themselves. Ammonia when exposed to sunlight and moisture or bacterial action is converted to nitric acid and becomes of course the same product that was to be eliminated in the first place.

The fourth difference is that the present invention can produce either essentially 100% elemental sulfur from the SOX or 100% $H_2S$ from the SOX. It will, however, be observed that although the present invention teaches that the $H_2S$ can be removed by appropriate scrubbing solutions, it can also be removed by selective oxidation reaction producing elemental sulfur and water in the vapor phase. The preferred procedure is to convert the SOX to elemental sulfur in a single operation which can then be removed in a single operation, and the scrubbing and concentration of the hydrogen sulfide or the oxidation of the hydrogen sulfide can be avoided.

The avoiding of the scrubbing and separate conversion of the $H_2S$ to elemental sulfur are two expensive operations which the present invention eliminates thus deriving an economic benefit for the process. It is a purpose, however, to make it possible to choose between the two methods which may have certain economic advantages, one over the other, in certain geographic or ecological situations.

DETAILED DESCRIPTION

The invention is essentially 100% effective in the removal of the oxides of sulfur and nitrogen from gas streams containing these contaminants at a level of 2% of SOX and up to 1% of NOX. The procedure consists briefly of adding a reducing gas preferably a mixture of CO and hydrogen derived from steam reforming of natural gas or hydrogen derived from the electrolysis of water or hydrogen commercially available to a flue gas which is controlled by firing conditions to less than 2% oxygen. The flue gas at temperatures of approximately 125° C. are mixed with sufficient of the hydrogen or the CO hydrogen mixture to remove residual oxygen and react with the oxides of sulfur and nitrogen to reduce them either to elemental sulfur, carbon dioxide and water and nitrogen or hydrogen sulfide, nitrogen, carbon dioxide and water. The catalyst employed and the operating conditions are the variables which permit the obtaining of either elemental sulfur or hydrogen sulfide as is preferred. Although there may be reasons for the conversion of the oxides of sulfur to hydrogen sulfide rather than to elemental sulfur, it is economically preferable to go directly to elemental sulfur during the catalytic reduction of the oxides of sulfur, because the scrubbing of $H_2S$ from the flue gas and the conversion of the hydrogen sulfide derived from the scrubbing operation, to elemental sulfur are expensive and are avoided. These two operations obviously are added to an already complex system and as such increase the cost and corrosion problems.

Catalysts used are in two families. The primary family is the spinels which are reaction products of divalent oxides such as those of cobalt, nickel, copper, zinc, and iron with trivalent oxides, such as chromium, aluminum, manganese, and iron. These when inter-reacted to form the spinels or when inter-reacted with titania or zirconia to form the inverse spinels are tolerant to sulfur. Since they are tolerant to sulfur they do not require presulfiding before being put into operation and, as a consequence, the equipment cost and time required for the presulfiding is eliminated for a substantial economic benefit.

The other family of catalysts are the heteropoly acids and their salts. These catalysts are also effective for the conversion of the sulfur oxides to elemental sulfur and hydrogen sulfide, and the nitrogen oxides to elemental nitrogen and water vapor, but these catalyst ordinarily must be sulfided and as a consequence have that as a drawback economically. They also typically are unsuitable when there is $O_2$ in the inlet gas and also do not produce a "clean" single product but the product normally consists of mixtures of $H_2S$, S and COS. This mixture is expensive to further process. It is preferred not to use elemental metals for the specific reason that the metals do produce ammonia and in some cases hydrogen cyanide. To burden the flue gas with these contaminants would be essentially as bad or worse than leaving the present contaminants in the gas stream. The fact that the invention process does not produce these gases is attributed to the composition of catalysts used.

A second control employed to direct the reaction to either elemental sulfur or hydrogen sulfide is in the process conditions. Increasing the space velocity tends to increase the amount of elemental sulfur whereas increasing the temperature tends to increase the amount of hydrogen sulfide. Controlling the stoichiometry of the hydrogen-carbon monoxide vis a vis the NOX and SOX will also determine the amount of elemental sulfur and hydrogen sulfide that is produced. Increasing the excess of hydrogen and reducing gas increases the amount of $H_2S$, whereas holding the hydrogen and reducing gases at essentially stoichiometric assures the formation of essentially 100% elemental sulfur. The conversion of the sulfur oxides to hydrogen sulfide is effected not only with the different catalyst, primarily the heteropoly acids, but also by keeping the temperature at a comparatively high level.

The spinel catalysts of the invention are stable to temperatures as high as 900° C. The heteropoly acid catalysts generally are limited to approximately 600° C. at the high end. Thermal stability of the catalyst can be improved by the addition of stabilizers such as refractory materials, melting above 1000° C. for example, alumina, magnesia, thoria, zirconia, titania, the lanthanides, tin oxide, and uranium oxide. Furthermore, the catalyst can be used in granular form, tabulated form, or preferably where pressure drop is limiting, on a honeycomb-type structure. Placing the catalyst on a honeycomb structure requires the incorporation into the catalyst composition of an ingredient which will aid in the formation of an adherent catalytic film. Honeycomb structure is mentioned prominently because it has very excellent characteristics in supporting catalyst, in retaining excellent characteristics in supporting catalyst, in retaining excellent activity, and in avoiding pressure drop. Catalysts can also be supported on wires compressed into sponge- or pillow-like forms and on ceramic cylinders or ceramic rings, saddles or the like.

Those materials which have been found to be most effective in making the catalytic material adhere to the support are colloidal silica, colloidal cerium oxide, colloidal titania, titania as a salt of an organic acid such as those sold by the Du Pont Company under the trade name of Tyzor. Tyzor LA is a preferred type of film former. The adhesive or film forming material is generally milled in a ball mill with the catalytic material in low quantities so as not to dilute or adversely affect the catalytic properties. Cerium oxide has some beneficial catalytic properties. The following are examples of the utilization of the invention but in no way limit the scope of the invention.

EXAMPLE 1

The following is a procedure for the preparation of a catalyst having especially good characteristics for the conversion of nitrogen oxides to water and elemental nitrogen and the sulfur oxides to hydrogen sulfide with little or no sulfur and little or no other compounds such as carbon disulfide and carbonyl sulfide.

1. Make an aqueous solution comprising a total volume of 2 liters in which are dissolved 375 grams of aluminum nitrate, nonahydrate, and 291 grams of cobalt nitrate hexahydrate.

2. Adjust the volume to exactly 2 liters and heat to 30° C. Have the precipitation equipment so set up that the nitrate solution can be agitated and concentrated ammonium carbonate solution and carbon dioxide gas can be added continuously during both the precipitation and digestion period. $CO_2$ flow rate should be 250 ml/minute.

3. Separately prepare a concentrated solution of ammonium carbonate and place this in a separatory funnel so it is just above the breaker in which the nitrates solution is being agitated.

4. With the temperature at 30° C. and the agitation being effected vigorously, add the concentrated ammonium carbonate solution to the solution of cobalt and aluminum nitrates until a pH of 6.8±0.2 pH has been reached.

5. At the conclusion of the precipitation, agitation is continued at 30° C. for an additional hour during which the carbon dioxide is being continuously added.

6. Filter the precipitate and discard the filtrate dry the filter cake for 24 hours at 150° C.±25√ C.

7. Calcine the catalyst in suitable containers preferably stainless steel or unglazed porcelain at 350° C. for 2 hours after the catalyst reaches that temperature.

8. Into a 2 liter ball mill containing 500 ml of half inch grinding pellets, add the 75 grams of powder produced in Step 7.

9. Next add to the ball mill 100 grams of colloidal ceria as a 22% solution of the type produced and sold by Rhone-Poluenc.

10. Lastly add to the ball mill 325 milliliters of distilled water.

11. Mill this mixture of powder, water and colloidal ceria for a period of at least 4 hours and preferably for 12-16 hours.

12. Remove the slurry from the ball mill and retain in a closed vessel.

13. Put 200 milliliters of the slurry after ball milling into a 500 milliliter beaker. Immerse one of the two inch long by ⅜ inch diameter honeycombs in the slurry and remove after the slurry has completely coated the surface.

14. Using a hair blower and the heat on "High", blow the surface of the honeycomb until the film that is adhering has been dried. Repeat once or twice or until the honeycomb is uniformly and completely coated.

15. Calcine the coated honeycomb at 250° C. for 3 hours. Catalyst pickup should equal 50% of the initial weight of the honeycomb. After the final calcining, the catalyst is ready for testing as will later be described in Example 15. Results obtained for this catalyst H-1 are given in Table II, tests Nos. 98 through 129.

Example 2

Repeat the steps as outlined in Example 1, except use 1 gram mole of nickel nitrate instead of 1 gram mole of cobalt nitrate as stipulated in Example 1. Results obtained for this catalyst are shown in Table I, tests 17A through 17D and 36 through 39.

EXAMPLE 3

In this example, three additional compositions will be prepared. The first being prepared by using 37.5 grams of the calcined powder from Example 1 and 37.5 grams of the powder from Example 2, thus comprising a 50-50 mixture of cobalt and nickel aluminate steps 11 through 15 of Example 1. As also a part of this Example 3 add 18.75 grams of cobalt aluminate powder from Example 1 and 56.25 grams of nickel aluminate powder from Example 2 and mill as instructed in steps 11 through 15 of Example 1. These, after having been added to the mill with the adhesive and milled, are then processed according to steps 11 through 15 of Example 1. These samples are identified as tests 61 through 65 with 1% $MoO_3$.

EXAMPLE 4

Example 4 is performed exactly as described for Example 1, with the exception that instead of employing a gram mole of cobalt nitrate, a gram mole of iron nitrate hydrated is used. After processing and coating the honeycomb as stipulated in Example 1, the sample is set aside for evaluation.

EXAMPLE 5

This example is the same as for Example 1 except the instructions in this case call for 1.5 moles of cobalt nitrate and one half mole of aluminum nitrate.

EXAMPLE 6

This example is performed exactly as for Example 1, with the exception that the cobalt nitrate is one half gram mole and the aluminum nitrate is 1.5 gram moles. The ensuing instructions are the same as for Example 1 to the point where the sample is available for testing.

EXAMPLE 7

This example is prepared exactly as stipulated for Example 1, with the exception that instead of using colloidal ceria as the adhesive as stipulated in Step 9, there is used the equivalent weight of titania solids as Tyzor LA, a product of the Du Pont Company.

EXAMPLE 8

This example follows the same instructions as those of Example 1, with the exception that instead of using the colloidal ceria the adhesive is colloidal silica in the form of Ludox SM of the equivalent weight of solids.

Ludox SM is a product of the Du Pont Company, but equivalent products can be purchased from other sources. Furthermore other colloid spherulite sizes can also be obtained and used with proper adjustment in the ratio of silica solids to catalytic powder. It should be stated at this time in the foregoing steps the amount of adhesive to add is stipulated as a fixed amount however, it can be observed that for certain catalyst powders, the quantity of adhesive solid must be modified to either more or less than stipulated in Example 1 in order to get a suitable catalytic coating which firmly adheres to the honeycomb and does not mud crack or peel.

EXAMPLE 9

In this example the aluminum nitrate in Example 1 is replaced first by magnesium nitrate in a molar equivalent quantity. The catalyst in this case is processed similarly to the instructions given in Example 1. As further parts of Example 9 one can substitute calcium nitrate, strontium nitrate, and barium nitrate. Also one can substitute the lanthanides as the nitrates, namely lanthanum, cerium, praseodymium, neodymium, and the mixtures of them and of the other lanthanides. Other lanthanides can be used, but they usually are too expensive to be a part of a catalyst of this type. Additionally, thoriumor uranium as nitrates can be used as a support. Of course, in the case of the latter two, which are radioactive, that must be taken into consideration insofar as a catalyst and the people handling the catalyst are concerned.

EXAMPLE 10

This catalyst (10A) is prepared identically to the steps for Example 1, with the exception that instead of using aluminum nitrate and the consequent oxide derived therefrom, there is used chromium nitrate which produced chromium oxide. All instructions subsequent to the precipitation of this composition are as outlined and stipulated for Example 1.

As additional portions of this example, part B can be a duplicate of Example 2 except for the chromia substitution for the alumina. Parts C, D and E are catalysts which would be made from 10A and 10B by a procedure similar to Example 3 which mixes various proportions of powder from Examples 1 and 2.

EXAMPLE 11

This example differs from the proceeding ten examples which were in all cases either a more or less well defined spinel or inverse spinel except Example 8 which is a silicate. Example 10 was the first one in which chromia was an ingredient and is the first one in which the catalyst has the greatest specificity for directing the conversion of the sulfur oxides to elemental sulfur. As was previously stated, the conversion to elemental sulfur is favored by lower temperatures and also by a minimization of the excess hydrogen, stoichiometric being preferred. However, in all cases the first requirement for the removal of the nitrogen oxides and the sulfur oxides is for oxygen first to be removed from the flue gas system. This is preferably performed at low temperatures and when hydrogen or carbon monoxide are used as the reducing agents the inlet temperature to the reactor can be held at low temperatures.

1. Four liters of aqueous solution are prepared containing one gram mole of cobalt nitrate, one gram mole of nickel nitrate, and 2 gram moles of aluminum nitrate, all as hydrates.

2. A concentrated ammonium carbonate solution is added to the solution of 1 at a temperature of 30° C. until a pH of 6.9+0.1 pH has been reached. At this point the nickel and cobalt have been precipitated, as basic carbonates and the aluminum as the hydroxide.

Note A: Carbon dioxide is added during the precipitation as well as for a period of 60 minutes following the precipitation. The precipitation should require 60 minutes.

3. After the one hour digestion period, the catalyst slurry is filtered and washed, then the filter cake is dried and calcined at 250° C. for 2 hours.

4. Dissolve 0.28 gram mole of $(NH_4)_6 \cdot Mo_7O_{24}$ in 2 liters of distilled water.

5. With the solution of ammonium molybdate at neutrality, and being vigorously agitated, adjust the temperature to 30° C., then begin adding a 10% solution of hydrochloric acid to the molybdate solution until a milkiness appears.

5a. While 5 is being performed the product of Step 5 is milled with one liter of distilled water and 500 ml of 1 cxm alumina balls in a one gallon ball mill. Mill for 4 hours.

6. Add 5a to 5 as soon as the milkiness appears this should be about pH 3.

7. Continue 10% HCl addition until a pH of 0.5 to 1.0 is reached.

8. Agitate for an additional 30 minutes, filter, wash with distilled water to remove the Cl ion.

9. Dry and calcine at 350° C. for 2 hours after reaching this temperature.

10. Grind and screen to the desired mesh size and test as granular material as described in Example 15.

11. The fines from 10 are milled with colloidal ceria and distilled water and are processed according to instructions 8 through 15 of Example 1.

Instead of the cobalt and nickel of Step 1, one can use only cobalt, only nickel, one half cobalt and one mole of iron or nickel and iron all as equal molar quantities. Instead of alumina, one can substitute all or part of the aluminum salt with, equal molar quantities of $SiO_2$, colloidal silica, the lanthanides, titania or alkali earths.

Instead of the ammonium molybdate one can substitute all or part with tungstate vanadate, trivalent or hexavalent chromium and niobium taking into account water solubility and special precipitation requirements.

EXAMPLE 12

This example describes the preparation of supported catalyst for a semi-works flue gas side stream reactor.

1. Following steps 1 through 13 of Example 1 until a quantity of milled slurry has been produced which is at least 10 times the volume of that produced in Example 1. Of course, this volume of slurry can also be produced by increasing volumes, weights and facilities by a 1 to 10 ratio.

2. Immerse in this slurry one 6 inch × 6 inch × 2 inch thick ceramic honeycomb with the openings parallel to the 2 inch dimension. The openings in this case are at a 100 per square inch density. The openings can be at a density of 20 per square inch to 400 per square inch. The judgment as to hole density is made on the basis of permissible pressure drop (large holes means low pressure drop and vice versa), required active catalytic surface and solids content of the gas stream.

3. Blow dry and free holes of any bridged catalyst.

4. Dry and calcine for two hours at 350° C. Repeat 3 and 4 above until the surfaces are uniformly covered and an approximately 50% increase in original weight of the honeycomb blocks has been obtained as catalytic coating.

5. Prepare a total of 2 cubic feet of blocks for charging to the semi-works unit as stipulated in Example 13.

EXAMPLE 13

1. The catalyst prepared in Example 12 is carefully loaded into a framework having spacing such that four blocks 6"×6"×2" can be accommodated in a single layer.

2. Place 12 layers in the framework making for a charge of catalyst 1 foot×1 foot×2 feet high.

3. The framework with the catalyst charged therein is now placed in the semi-works reactor and the reactor is closed to make gas tight.

4. An inlet line is attached at the top and an exit line at the bottom. An internal distributor plate assures uniform gas distribution and flow through the reactor and catalyst. Thermocouples are in the inlet and exit lines and in the catalyst at 8 and 16 inches from the top of the catalyst charge.

5. Means are provided for regulating, heating and measuring the gas flow. The results of making this test are reported in Example 14.

Example 14

1. The catalyst and facilities of Example 13 were adjusted to 350° C., the flow was at a space velocity of 3500 with the gas being derived from coal fired steam generating furnaces. The steam was used to generate electricity for the municipality of St. Marys, Ohio.

2. The flue gas from the boiler contained 700 ppm NOX and 3,500 ppm of SOX and some residual coal ash dust. To this gas stream was added sufficient hydrogen to remove any $O_2$ and sufficient additional to effect the reactions SOX to $H_2S$ and NOX to elemental $N_2$ and water.

3. At the foregoing temperature and flow conditions 98% of the SOX was converted to $H_2S$ and 96% of the NOX was converted to elemental nitrogen and water. Additionally and excess of 100% $H_2$ above that necessary for these SOX and NOX reactions was also added.

4. Flow was continued for eleven days when performance dropped off to 85% conversion of the SOX to $H_2S$ and 81% for the NOX to elemental nitrogen and water.

5. After 21 days the conversions were 74% for the SOX and 69% for the NOX to elemental nitrogen and water. AT no time was there any ammonia, HCN, or any other nitrogen compound other than residual NOX in the off gas.

6. The reactor temperature was raised to 380° C. and the conversions were increased to 82% and 79% for the SOX and NOX respectively and continued at this level for several hours but after a total of 22 days the conversion in both cases was again below 75%.

7 The unit was shut down, cooled and the frame containing the catalyst was removed from the converter and was found to be coated with a layer of coal ash dust. This was removed from the upper half by an air blast from the removed catalyst blocks and from the bottom half by immersing the framework and catalyst into a vessel of water. After several raisings and lowerings of the framework and catalyst into the water, the catalyst appeared clean and no further dust was removed by immersion in clear water. The remarkable fact was that these treatments removed no catalyst coating from the honeycomb support the catalyst adhered perfectly to the support.

8. The air blown catalyst was returned to the framework and the charge now, half regenerated by water wash and half by air blowing was heated in the reactor to 350° C. over a one hour period.

9. All gas flows including the reducing gas were restored to the conditions pertaining in Step 2 above and analysis were again made. Conversion was essentially the same as reported in Steps 3, 4 and 5 above, indicating that the regeneration procedures were 100% effective. It became apparent that the catalyst life could be extended indefinitely by either regeneration procedure, probably engineered to be performed in place. It also indicated that the catalyst would last indefinitely if the coal ash dust could be removed completely by efficient filtration or electrostatic precipitation or both before the gas reached the catalyst.

EXAMPLE 15

The catalyst examples prepared by the procedures and containing the ingredients stipulated in Examples 1 through 14 were evaluated in bench scale or semi-works as follows:

The catalyst either in the form of granules or supported on a honeycomb was charged to a quartz reactor, housed in an electric furnace with temperature control. Gas of a selected composition entered one end and exited the other. Internal temperatures were controlled and monitored. The inlet gas was monitored for SOX, NOX, $H_2$ and CO whereas the exit gas was monitored for NOX, SOX, $H_2S$, COS, $CS_2$, $NH_3$, HCN, and CO.

Conversion sought was 95+% of the SOX and NOX and CO content of less than 200 ppm.

A summary of the bench scale results is given in Table I,

TABLE I

Laboratory Tests of SO2—MO Reduction Catalysts

| Test Number | Furnace Temp. C. | Space, Velocity l/Hr | *% Excess H2 | Catalyst Active Metals | O2 % | Feed SO2 ppm | MO ppm | Conversions O2 | Vol % SO | Vol % MO | Sulfur Products Vol. % H2S | Sulfur |
|---|---|---|---|---|---|---|---|---|---|---|---|---|
| 9A | 500 | 5000 | 14 | Cr | | 1000 | 500 | | 54 | 99.6 | 21.3 | 32.7 |
| 9B | 350 | 5000 | 33 | Cr | | 1000 | 0 | | 28.5 | | 18 | 10.5 |
| 9C | 500 | 5000 | 33 | Cr | | 1000 | 0 | | 108 | | 42 | 58 |
| 11 | 500 | 20000 | 144 | V | | 2000 | 100 | | 0 | 60 | 0 | 0 |
| 12 | | | | | | | | | | | | |
| 13 | 500 | 20000 | 144 | Te | | 2000 | 700 | | 54 | 57 | 0 | 54 |
| 14 | | | | | | | | | | | | |
| 15A | 500 | 20000 | 0 | Mo—Ni | | 2000 | 700 | | 100 | 80 | 33.5 | 66.5 |
| 15B | 500 | 20000 | 45 | Mo—Ni | | 2000 | 700 | | 100 | 99 | 41.5 | 58.5 |
| 16A | 500 | 10000 | 0 | Cr | | 2000 | 700 | | 60 | 74 | 2 | 58 |
| 16B | 600 | 10000 | 0 | Cr | | 2000 | 700 | | 100 | 98.6 | 16 | 84 |
| 16C | 600 | 20000 | 0 | Cr | | 2000 | 700 | | 76.5 | 91.4 | 6.5 | 70 |
| 16D | 700 | 20000 | 0 | Cr | | 2000 | 700 | | 95 | 96.6 | 14 | 81 |
| 17A | 500 | 10000 | 0 | Cr—Ni | | 2000 | 700 | | 100 | 96.3 | 26 | 74 |
| 17B | 500 | 20000 | 0 | Cr—Ni | | 2000 | 700 | | 85 | 67 | 14 | 71 |
| 17C | 550 | 10000 | 0 | Cr—Ni | | 2000 | 700 | | 100 | 99.6 | 33.5 | 66.5 |
| 17D | 600 | 10000 | 0 | Cr—Ni | | 2000 | 700 | | 100 | 99.9 | 38 | 62 |
| 21 | 500 | 20000 | 144 | Nb | | 2000 | 700 | | 0 | 39 | 0 | 0 |
| 22 | 500 | 20000 | 144 | Re | | 2000 | 700 | | 100 | 96 | 95 | 5 |
| 23 | 500 | 20000 | 144 | Cr—Ni—Re | | 2000 | 700 | | 100 | 98 | 96 | 4 |
| 24 | 500 | 20000 | 144 | Cr—Re | | 2000 | 700 | | 100 | 100 | 51 | 49 |
| 25 | 500 | 10000 | 144 | Cr—Ni | | 2000 | 700 | | 100 | 100 | 72 | 28 |
| 26 | 500 | 20000 | 144 | Cr—Ni—Re | | 2000 | 700 | | 100 | 87 | 48 | 52 |
| 27 | 598 | 10000 | 140 | Cr—Ni/Mo—Ni | 2 | 2000 | 700 | | 100 | 99.5 | 98 | 2 |
| 28 | 588 | 10000 | 140 | Cr—Ni/HMo—Ni | 2 | 4000 | 700 | | 100 | 100 | 98.5 | 1.5 |
| 29 | 550 | 10000 | 140 | Cr—Ni/Mo—Ni | 2 | 4000 | 700 | | 100 | 100 | 99.6 | 0.4 |
| 30 | 550 | 20000 | 140 | Cr—Ni/Mo—Ni | 2 | 4000 | 700 | | 100 | 100 | 69.3 | 10.7 |
| 31 | 500 | 10000 | 140 | Cr—Ni/Mo—Ni | 2 | 4000 | 700 | | 100 | 99.3 | 96 | 4 |
| 32 | 550 | 20000 | 140 | Cr—Ni/Mo—Ni | 2 | 4000 | 700 | | 100 | 99.4 | 98.6 | 1.4 |
| 33 | 520 | 20000 | 33 | Cr—Ni/Mo—Ni | 2 | 4000 | 700 | 98 | 100 | 98.2 | 50 | 50 |
| 34 | 520 | 20000 | 33 | Cr—Ni/Mo—Ni | 2 | 4000 | 700 | 33 | 100 | 98.3 | 61 | 39 |
| 35 | 520 | 20000 | 100 | None | 0 | 4000 | 0 | | 0 | 7 | 0 | 0 |
| 36 | 500 | 20000 | 100 | Cr—Ni | 0 | 4000 | 0 | | 90.6 | | 25 | 65.5 |
| 37 | 520 | 20000 | 100 | Cr—Ni | 0 | 4000 | 0 | | 95 | | 30 | 65 |
| 38 | 400 | 13300 | 100 | Cr—Ni | 0 | 4000 | 0 | | 50 | | 16 | 34 |
| 39 | 250 | 13300 | 100 | Cr—Ni | 0 | 4000 | 0 | | 99.7 | | 95 | 4.7 |
| 40 | 500 | 20000 | 140 | HCr—Ni/HMo—Ni | 2 | 4000 | 700 | 97.5 | 100 | 99.3 | 100 | 0 |
| 41 | 520 | 20000 | 34 | HCr—Ni/HMo—Ni | 2 | 4000 | 700 | 69.5 | 45 | 52.4 | 6.9 | 38.1 |
| 42 | 520 | 10000 | 34 | HCr—Ni/HMo—Ni | 2 | 4000 | 700 | 99.5 | 100 | 99.6 | 71.3 | 28.7 |
| 43 | 520 | 10000 | 140 | HCr—Ni/HMo—Ni | 2 | 4000 | 700 | 98.3 | 100 | 99.7 | 100 | 0 |
| 44 | 520 | 10000 | 140 | HCr—Ni/HMo—Ni | 2 | 4000 | 700 | 9 | 0 | 31.9 | 0 | 0 |
| 45 | 520 | 10000 | 140 | Ni—Re/Mo | 1.7 | 6000 | 600 | 97.8 | 100 | 99.7 | 100 | 0 |
| 46 | 520 | 10000 | 34 | Ni—Re/Mo | 1.7 | 4000 | 600 | 98.6 | 100 | 99.5 | 75 | 25 |
| 47 | 520 | 20000 | 34 | Ni—Re/Mo | 1.87 | 4000 | 615 | 98 | 100 | 99.9 | 65 | 35 |
| 48 | 520 | 20000 | 140 | Ni—Re/Mo | 1.87 | 4000 | 615 | 98.4 | 100 | 99.8 | 65 | 35 |
| 49 | 520 | 10000 | 42 | HMo—Ni—Re | 1.7 | 3000 | 530 | 92.4 | 100 | 99 | 100 | 0 |
| 50 | 520 | 10000 | 154 | HMo—Ni—Re | 1.7 | 3000 | 530 | 98.6 | 100 | 99 | 100 | 0 |
| 51 | 520 | 10000 | 51 | HMo—Ni—Pd—Re | 1.7 | 2000 | 750 | 94 | 100 | 99.5 | 100 | 0 |
| 52 | 520 | 10000 | 178 | HMo—Ni—Pd—Re | 1.7 | 2000 | 750 | 97.5 | 100 | 99.5 | 100 | 0 |

TABLE I-continued
Laboratory Tests of SO2—MO Reduction Catalysts

| Test # | Furnace Temp. C. | Temp. In Deg. C. | Temp. Out Deg. C. | Space Vel. l/hr | % Excess H2 | Catal Number | H2 % | CO % | CO2 % | O2 % | SO2 % | MO % | H2 % | H2O % | PROD H2 % | PROD CO % | PROD O2 % | CONV O2 % | CONV SO2 % | CONV MO % | DIST H2S % | DIST COS % | DIST CS2 % | DIST Sulfur % |
|---|---|---|---|---|---|---|---|---|---|---|---|---|---|---|---|---|---|---|---|---|---|---|---|---|
| 53 | 599 | 520 | | 10000 | | | | | | | | | | | | | | 97.6 | 99.3 | 99.1 | 94.3 | | | 8.5 |
| 54 | 599 | 520 | | 10000 | | Mo—Ni—Pd—Re | | | | | 1.7 | | | | | | | 90 | 98 | 97.8 | 84.3 | | | 3.7 |
| 55 | 650 | 560 | | 10000 | | HCo—Cr—Ni/HMo—Ni | | | | | 1.7 | | | | | | | 97 | 96 | 98.4 | 81.4 | | | 14.6 |
| 56 | 650 | 560 | | 10000 | | HCo—Cr—Ni/HMo—Ni | | | | | 1.7 | | | | | | | 96.2 | 100 | 98.7 | 81.4 | | | 18.6 |
| 57 | 700 | 560 | | 10000 | | HCr—Mo—Ni | | | | | 1.7 | | | | | | | 98.2 | 100 | 99.9 | 71.4 | | | 28.6 |
| 58 | 700 | 520 | | 10000 | | HCr—Mo—Ni | | | | | 1.7 | | | | | | | 98 | 100 | 99.1 | 81.5 | | | 18.5 |
| 59 | 385 | 520 | | 10000 | | GCo—Cr—Mo | | | | | 1.7 | | | | | | | 99.1 | 100 | 98.3 | 91.4 | | | 8.6 |
| 60 | 500 | 520 | | 10000 | | GCo—Cr—Mo | | | | | 1.7 | | | | | | | 90.7 | 100 | 98.8 | 99 | | | 1 |
| 61 | 600 | 520 | | 10000 | | GCr—Mo—Ni | | | | | 1.7 | | | | | | | 99.7 | 100 | 99.3 | 97 | | | 3 |
| 62 | 650 | 560 | | 10000 | | HCo—Mo—Ni | | | | | 1.7 | | | | | | | 97.1 | 100 | 99.6 | 97 | | | 3 |
| 63 | 560 | 600 | | 10000 | | HCo—Mo—Ni | | | | | 1.7 | | | | | | | 98.7 | 100 | 99.4 | 97 | | | 3 |
| 64 | 560 | 560 | | 10000 | | HCo—Mo—Ni | | | | | 1.7 | | | | | | | 98 | 100 | 99.7 | 97 | | | 3 |
| 65 | 560 | 560 | | 10000 | | HCo—Mo—Ni | | | | | 1.7 | | | | | | | 98.8 | 100 | 99.8 | 97 | | | 3 |
| 66 | 560 | 560 | | 10000 | | HCo—Mn—Mo—Ni | | | | | 1.7 | | | | | | | 98.3 | 100 | 99.9 | 96 | | | 4 |
| 67 | 560 | 560 | | 10000 | | HCo—Mn—Mo—Ni | | | | | 1.7 | | | | | | | 99 | 100 | 99.7 | 97 | | | 3 |
| 68 | 560 | 560 | | 10000 | | HMo—Ni | | | | | 1.7 | | | | | | | 98.7 | 100 | 99.9 | 97 | | | 3 |
| 69 | 560 | 560 | | 10000 | 200 | HCo—Mn—Mo—Ni | | | | | 1.7 | | | | | | | 98.6 | 100 | 98.8 | 97 | | | 3 |
| 70 | 560 | 560 | | 10000 | 100 | HCo—Mn—Mo—Ni | | | | | 1.7 | | | | | | | 96.8 | 100 | 89.9 | 97 | | | 3 |
| 71 | 600 | 600 | | 10000 | 100 | HCo—Mn—Mo—Ni | | | | | 1.7 | | | | | | | 99 | 100 | 99.6 | 97 | | | 3 |
| 72 | 600 | 600 | | 15000 | 33 | HCo—Mn—Mo—Ni | | | | | 1.7 | | | | | | | 87.1 | 100 | 91.4 | 80 | | | 16.3 |
| 73 | 371 | | | 5000 | 33 | HCo—Mn—Mo—Ni | | | | | 1.7 | | | | | | | 0 | 38.3 | 28.6 | 0.9 | | | 23.8 |
| 74 | 599 | | | 5000 | | HCo—Mn—MO—Ni | | | | | 1.7 | | | | | | | 98.4 | 93.1 | 92.1 | 80 | | | 0.8 |

| Test # | Furnace Temp. C. | Temp. In Deg. C. | Temp. Out Deg. C. | Space Vel. l/hr | % Excess H2 | Catal Number | H2 % | CO % | CO2 % | O2 % | SO2 % | MO % | H2 % | H2O % | PROD H2 % | PROD CO % | PROD O2 % | CONV O2 % | CONV SO2 % | CONV MO % | DIST H2S % | DIST COS % | DIST CS2 % | DIST Sulfur % |
|---|---|---|---|---|---|---|---|---|---|---|---|---|---|---|---|---|---|---|---|---|---|---|---|---|
| 75 | 599 | | | 5000 | 2.60 | H2 | 6.95 | 0.93 | 4.74 | 3.28 | 0.35 | 0.07 | 33.68 | 0 | 0.45 | 0.22 | 0.05 | 98.6 | 99.7 | 99.6 | 90 | 1.3 | 0 | |
| 76 | 599 | | | 7500 | 12.05 | H2 | 7.71 | 0.94 | 4.79 | 3.3 | 0.35 | 0.07 | 32.85 | 0 | 1.18 | 0.63 | 0.17 | 95 | 97.3 | 80.5 | 25 | 2.7 | 0 | 69.6 |
| 77 | 650 | | | 5000 | 4.58 | H2 | 7.07 | 0.92 | 4.69 | 3.26 | 0.35 | 0.07 | 83.64 | 0 | 0.75 | 0.29 | 0.09 | 97.4 | 99.7 | 99.7 | 96.9 | 1.5 | 0 | 1.3 |
| 78 | 700 | | | 5000 | 8.00 | H2 | 6.72 | 0.94 | 4.79 | 3.27 | 0.35 | 0.07 | 83.86 | 0 | 0.83 | 0.34 | 0.05 | 98.5 | 98.9 | 99.5 | 97.2 | 1.7 | 0 | 0 |
| 79 | 385 | 435 | | 5000 | 4.33 | G9 | 7.84 | 0.91 | 4.62 | 3.25 | 0.35 | 0.07 | 83.76 | 0 | 0.88 | 0.25 | 0.04 | 98.9 | 100 | 97.7 | 97.4 | 2.6 | 0 | 0 |
| 80 | 500 | 587 | | 5000 | −0.91 | G9 | 6.72 | 0.91 | 4.61 | 3.29 | 0.35 | 0.07 | 84.06 | 0 | 0.59 | 0.23 | 0.04 | 99 | 100 | 98.9 | 98.4 | 1.6 | 0 | 0 |
| 81 | 600 | 664 | | 5000 | 8.31 | G9 | 7.35 | 0.86 | 4.37 | 3.23 | 0.35 | 0.07 | 83.77 | 0 | 0.54 | 0.25 | 0.02 | 99.4 | 100 | 99.4 | 98.4 | 1.6 | 0 | 0 |
| 82 | 650 | 700 | | 5000 | 7.52 | G9 | 7.24 | 0.91 | 4.62 | 3.23 | 0.35 | 0.07 | 83.58 | 0 | 0.84 | 0.25 | 0.04 | 98.9 | 100 | 99.2 | 98.1 | 1.9 | 0 | 0 |
| 83 | 560 | | | 5000 | 8.00 | H2 | 4.63 | 0 | 0 | 1.71 | 0.35 | 0.07 | 93.21 | 0 | 0.36 | 0.33 | 0.04 | 97.6 | 100 | 96.2 | 93.8 | 0 | 0 | 6.2 |
| 84 | 560 | | | 5000 | 29.65 | H2 | 5.99 | 0 | 0 | 1.75 | 0.35 | 0.07 | 91.95 | 0 | 1.76 | 0 | 0.03 | 98.5 | 100 | 99.6 | 100 | 0 | 0 | 0 |
| 85 | 560 | | | 5000 | 3.18 | H2 | 5.56 | 1.88 | 9.58 | 3.53 | 0.35 | 0.07 | 78.04 | 0 | 0.18 | 0.81 | 0.03 | 99.2 | 100 | 99.5 | 98.5 | 1.6 | 0 | 0 |
| 86 | 560 | | | 5000 | 43.30 | H2 | 9.28 | 2.7 | 13.75 | 3.26 | 0.35 | 0.07 | 70.23 | 0 | 2.14 | 2.62 | 0.02 | 99.3 | 100 | 99.6 | 97.9 | 2.1 | 0 | 0 |
| 87 | 560 | 621 | 335 | 5000 | 5.63 | H23 | 12.19 | 0 | 11.77 | 5.21 | 0.35 | 0.07 | 70.41 | 0 | 0.63 | 0.35 | 0.05 | 100 | 100 | 99.4 | 98.8 | 1.2 | 0 | 0 |
| 88 | 560 | 627 | 400 | 5000 | 7.84 | H23 | 13.2 | 0 | 9.06 | 5.56 | 0.35 | 0.07 | 71.8 | 0 | 1.58 | 0.28 | 0.04 | 99.4 | 98.3 | 39.3 | 97.4 | 0.9 | 0 | 65 |
| 89 | 480 | 561 | 289 | 7500 | 7.84 | H23 | 13.2 | 0 | 9.06 | 5.55 | 0.35 | 0.07 | 31.9 | 0 | 1.55 | 0.24 | 0.03 | 99.5 | 99.7 | 99.4 | 99.5 | 0.2 | 0 | 0 |
| 90 | 300 | 537 | 224 | 7500 | 7.48 | H23 | 12.79 | 0 | 11.79 | 5.39 | 0.35 | 0.07 | 69.63 | 0 | 1.31 | 0.29 | 0.06 | 99 | 100 | 39.5 | 99.7 | 0.3 | 0 | 0 |
| 91 | 300 | 490 | 220 | 7500 | −14.87 | H23 | 16.13 | 0 | 11.72 | 5.39 | 0.36 | 0.07 | 72.29 | 0 | 0 | 0.08 | 0.1 | 98.3 | 74.1 | 69.6 | 6.2 | 3 | 0 | 65 |
| 92 | 300 | 533 | 219 | 7500 | −8.45 | H23 | 11.27 | 0 | 12.02 | 5.58 | 0.35 | 0.07 | 70.7 | 0 | 0 | 0.22 | 0.07 | 98.7 | 93.1 | 95.9 | 81.6 | 2 | 0 | 9.6 |
| 93 | 300 | 562 | 310 | 7500 | −9.46 | G9 | 11.3 | 0 | 11.77 | 5.68 | 0.35 | 0.07 | 70.83 | 0 | 0.13 | 0.2 | 0.43 | 32.9 | 100 | 97.4 | 97.8 | 2.2 | 0 | 0 |
| 94 | 300 | 585 | 389 | 7500 | −1.31 | G93 | 12.64 | 0 | 11.77 | 5.54 | 0.35 | 0.07 | 70.23 | 0 | 0.41 | 0.4 | 0.35 | 94.1 | 100 | 98 | 98 | 2 | 0 | 0 |
| 95 | 300 | 321 | 294 | 20000 | −6.77 | G3 | 11.71 | 0 | 11.16 | 5.72 | 0.35 | 0.07 | 71 | 0 | 10.64 | 0 | 5.23 | 0 | 89.6 | 10.1 | 0 | 0 | 89.9 |
| 96 | 300 | 382 | 329 | 10000 | 0.67 | G3 | 11.98 | 0 | 10.16 | 5.39 | 0.35 | 0.07 | 72.05 | 0 | 0.84 | 0.65 | 0.56 | 90.2 | 100 | 89.7 | 71.8 | 1.9 | 0 | 26.3 |
| 97 | 300 | 487 | 345 | 15000 | 1.00 | G3 | 12.1 | 0 | 11.16 | 5.43 | 0.35 | 0.07 | 70.89 | 0 | 0.71 | 0.45 | 0.54 | 90.5 | 100 | 73.1 | 83.6 | 1.8 | 0 | 14.6 |
| 98 | 300 | 438 | 290 | 7500 | −2.95 | G1 | 11.84 | 0 | 15.46 | 5.54 | 0.35 | 0.07 | 66.74 | 10.2 | 0.7 | 0.26 | 0.13 | 97.7 | 100 | 99.5 | 98.9 | 1.1 | 0 | 0 |
| 99 | 300 | 318 | 281 | 7500 | 18.00 | G1 | 1.43 | 0 | 15.75 | 0 | 0.41 | 0.07 | 72.15 | 10.2 | 1.25 | 0 | 0 | | 26.7 | 35.4 | 26.7 | 0.6 | 0 | 0 |
| 100 | 400 | 419 | 373 | 7500 | 10.00 | G1 | 2.43 | 0 | 16.74 | 0 | 0.41 | 0.07 | 72.16 | | 0 | 0 | 0.02 | | 100 | 72.1 | 99.4 | | | |

TABLE I-continued
Laboratory Tests of SO2—MO Reduction Catalysts

| | | | | | | | | | | | | | | | | | | | | | | |
|---|---|---|---|---|---|---|---|---|---|---|---|---|---|---|---|---|---|---|---|---|---|---|
| 101 | 400 | 419 | 373 | 7500 | 66.92 | G1 | 2.22 | 0 | 16.33 | 0.03 | 0.4 | 0.07 | 69.09 | 12.86 | 1.03 | 0.09 | 0.03 | 100 | 99.5 | 99.4 | 0.6 | 0 |
| 101 | 400 | 419 | 373 | 7500 | 66.92 | G1 | 2.22 | 0 | 16.33 | 0.03 | 0.4 | 0.07 | 69.09 | 12.86 | 1.03 | 0.09 | 0.03 | 100 | 99.5 | 99.4 | 0.6 | 0 |
| 102 | 350 | 366 | 331 | 7500 | 66.92 | G1 | 2.32 | 0 | 16.33 | 0.03 | 0.4 | 0.07 | 69.09 | 12.86 | 1.03 | 0.04 | 0.03 | 100 | 95.3 | 99.6 | 8.4 | 0 |
| 103 | 320 | 338 | 302 | 7500 | 64.71 | G1 | 2.24 | 0 | 15.46 | 0.03 | 0.41 | 0.07 | 69.8 | 12 | 1.15 | 0.01 | 0.03 | 100 | 94.9 | 96.9 | 0.7 | 2.5 |
| 104 | 320 | 334 | 304 | 7500 | 134.65 | G1 | 2.93 | 0 | 14.51 | 0.03 | 0.38 | 0.07 | 64.66 | 17.38 | 2 | 0 | 0.03 | 100 | 96.5 | 160 | 0 | 0 |
| 105 | 320 | 325 | 309 | 10000 | 144.35 | G1 | 3.03 | 0 | 14.74 | 0.03 | 0.37 | 0.07 | 65.68 | 16.1 | 2.07 | 0 | 0.04 | 100 | 73 | 100 | 0 | 0 |
| 106 | 320 | 328 | 309 | 10000 | 174.80 | G1 | 3.38 | 0 | 12.15 | 0.03 | 0.37 | 0.06 | 62.2 | 21.31 | 2.62 | 0 | 0.04 | 100 | 83.7 | 100 | 0 | 0 |
| 107 | 320 | 333 | 302 | 7500 | 129.32 | G1 | 3.05 | 0 | 14.83 | 6.03 | 0.4 | 6.07 | 66.09 | 15.56 | 1.96 | 0 | 0.03 | 100 | 91 | 100 | 0 | 0 |
| 108 | 340 | 350 | 317 | 7500 | 129.32 | G1 | 3.05 | 0 | 14.83 | 0.03 | 0.4 | 5.07 | 66.09 | 15.56 | 1.96 | 0.03 | 0.03 | 100 | 98.5 | 99.3 | 0.02 | 0 |
| 109 | 320 | 350 | 291 | 6000 | 137.69 | G1 | 3.09 | 0 | 15.04 | 0.03 | 0.39 | 0.07 | 67.02 | 14.36 | 1.7 | 0.29 | 0.03 | 100 | 99.7 | 99.9 | 0.03 | 0 |
| 110 | 310 | 328 | 285 | 5000 | 137.69 | G1 | 3.09 | 0 | 15.04 | 0.03 | 3.07 | 3.07 | 67.02 | 14.36 | 2 | 8 | 0.04 | 100 | 98.8 | 100 | 0 | 0 |
| 111 | 320 | 315 | 306 | 7500 | 134.13 | H1 | 2.95 | 0 | 14.34 | 0.04 | 0.32 | 0.07 | 66.99 | 18.26 | 2.71 | 0 | 0.04 | 64.7 | 4.7 | 19.1 | 0.1 | 45.5 |
| 112 | 350 | 345 | 336 | 7500 | 134.81 | H1 | 3.17 | 0 | 15.42 | 0.04 | 0.4 | 0.07 | 66.94 | 11.96 | 2.35 | 0 | 0.04 | 96.4 | 92.6 | 44.7 | 2.2 | 49.6 |
| 113 | 400 | 391 | 379 | 5000 | 138.46 | H1 | 3.1 | 0 | 15.09 | 0.03 | 0.4 | 0.07 | 67.42 | 13.9 | 2.08 | 0.19 | 0.04 | 100 | 99.5 | 98.4 | 1.6 | 0 |
| 114 | 320 | 334 | 329 | 7500 | 144.54 | H1 | 2.91 | 0 | 14.17 | 0.01 | 0.39 | 0.06 | 63.13 | 19.35 | 2.65 | 0 | 0.01 | 69 | 0 | 22.9 | 0 | 46.1 |
| 115 | 350 | 373 | 381 | 5000 | 136.92 | H1 | 3.08 | 0 | 14.99 | 0.03 | 0.37 | 0.07 | 68.99 | 14.45 | 2.15 | 0 | 0.03 | 100 | 72.8 | 80.2 | 0.3 | 19.5 |
| 116 | 320 | 322 | 331 | 5000 | 146.34 | H1 | 3.03 | 0 | 14.78 | 0.38 | 0.38 | 2.07 | 66.84 | 15.89 | 2.09 | 0.01 | 0.01 | 100 | 97.5 | 99.7 | 0.3 | 0 |
| 117 | 340 | 338 | 350 | 5000 | 142.40 | G/H1 | 3.03 | 0 | 14.78 | 0.02 | 0.38 | 0.07 | 66.82 | 15.89 | 2.02 | 0.05 | 0.01 | 100 | 99.2 | 99.7 | 0.3 | 0 |
| 118 | 350 | 365 | 312 | 2500 | 145.74 | H1 | 2.17 | 0 | 15.42 | 0.01 | 0.4 | 2.07 | 68.97 | 11.96 | 1.87 | 0.21 | 0.01 | 100 | 99.7 | 99.1 | 0.9 | 0 |
| 119 | 320 | 335 | 253 | 2500 | 140.30 | H1 | 3.22 | 0 | 15.7 | 0.02 | 0.41 | 0.07 | 70.15 | 10.43 | 1.98 | 0.1 | 0.02 | 100 | 99.5 | 99.5 | 0.5 | 0 |
| 120 | 320 | 331 | 308 | 3750 | 142.75 | H1 | 3.18 | 0 | 15.46 | 0.02 | 0.5 | 0.07 | 68.88 | 12 | 2.92 | 0.01 | 0.02 | 100 | 75.5 | 99.8 | 0.2 | 0 |
| 121 | 350 | 355 | 334 | 3750 | 142.75 | H1 | 3.18 | 0 | 15.45 | 0.02 | 0.4 | 0.07 | 68.88 | 12 | 2.02 | 0.07 | 0.02 | 100 | 99.6 | 99.5 | 0.5 | 0 |
| 122 | 320 | 326 | 302 | 1750 | 168.06 | H1 | 3.2 | 0 | 15.59 | 0.01 | 0.4 | 0.07 | 69.48 | 11.24 | 2.05 | 0.03 | 9.01 | 100 | 98.4 | 99.1 | 0.9 | 0 |
| 123 | 320 | 323 | 309 | 5000 | 168.41 | H1 | 3.13 | 0 | 15.22 | 0.01 | 0.39 | 0.07 | 67.81 | 13.37 | 2.32 | 0 | 0.02 | 100 | 45.8 | 70.9 | 1.3 | 27.8 |
| 124 | 348 | 335 | 329 | 5000 | 168.41 | H1 | 3.13 | 0 | 15.22 | 0.01 | 0.39 | 0.07 | 67.51 | 13.37 | 2.14 | 0.01 | 0.02 | 100 | 70.2 | 81.3 | 1.2 | 17.5 |
| 125 | 360 | 360 | 344 | 5000 | 144.70 | H1 | 3.23 | 0 | 15.74 | 0.01 | 0.41 | 0.07 | 70.41 | 10.5 | 1.89 | 0.16 | 0.01 | 100 | 99.5 | 94.7 | 2.1 | 3.2 |
| 126 | 320 | 335 | 292 | 4000 | 141.22 | H1 | 3.16 | 0 | 15.4 | 0.02 | 0.4 | 0.07 | 68.52 | 12.33 | 1.99 | 0.1 | 0.02 | 100 | 98.9 | 99.7 | 0.03 | 0 |
| 127 | 300 | 315 | 275 | 4056 | 144.17 | H1 | 2.93 | 0 | 14.44 | 0.02 | 0.32 | 0.07 | 63.55 | 18.63 | 1.93 | 0 | 0.01 | 99.9 | 46.7 | 99.8 | 0.01 | 0 |
| 128 | 310 | 321 | 275 | 2500 | 143.41 | H1 | 3.14 | 0 | 15.28 | 0.31 | 0.07 | 0.07 | 67.35 | 13.76 | 2.12 | 0 | 0.01 | 100 | 95.9 | 100 | 0 | 0 |
| 129 | 315 | 337 | 269 | 3500 | 143.41 | H1 | 3.14 | 0 | 15.28 | 0.01 | 0.4 | 0.07 | 67.25 | 13.76 | 2.09 | 0.03 | 0.01 | 100 | 99.5 | 100 | 0 | 0 |

*% Excess H2 + CO = ((H2% + CO%)/(2*O2% + 3*SO2% + NO%) − 1)*(100%)
Catalysts Used in Tests 75–129
(G = Granular H = Honeycomb)

Catalysts

| Number | Composition |
|---|---|
| 1 | CoO—Al2O3 (50:50 by weight) |
| 2 | Ni, Mo, Co, MnOx |
| 3 | Pt OH Al2O3 |
| 23 | (Ni, Mo, Co, MnOX) + Pt on Al2O3 |
| 9 | Unocal Catalyst |
| 93 | Unocal catalyst) + (Pt on Al2O3 |

What is claimed is:

1. A method of obtaining acid rain abatement from a flue gas containing nitrogen oxides (NOX) and sulfur oxides (SOX) comprising the steps of treating the flue gas with a reducing agent to remove the remaining oxygen and produce an effluent, the reducing agent being selected from group consisting of natural gas, methane, a mixture of CO and hydrogen derived from steam, hydrocarbon, and hydrogen, passing the effluent over a catalyst to simultaneously reduce the NOX to water and elemental nitrogen and the SOX to $H_2S$ or elemental sulfur, the catalyst being selected from the group consisting of spinels and inverse spinels, calcined at a temperature no greater than 700° C. and stabilized by a co-precipitated refractory oxide, the refractory oxide being selected from the group consisting of alumina, magnesia, thoria, zirconia, titania, the lanthanides, tin oxide and uranium oxide, the reducing of the NOX and SOX taking place in a temperature range of 200°–900° C., and removing the sulfur or sulfur compounds from the reduced flue gas to thereby remove essentially all of the NOX and SOX.

2. The method of claim 1 wherein the oxygen reducing agent is selected from the group consisting of natural gas and methane.

3. The method of claim 1 wherein essentially all of the SOX is reduced to elemental sulfur, and removing the sulfur by cyclones, filters or electrostatic precipitation.

4. The method of claim 1 wherein essentially all of the SOX is reduced to hydrogen sulfide, the hydrogen sulfide is scrubbed by a scrubbing medium and then regenerated from the scrubbing medium in an alkaline oxidizing operation.

5. The method of claim 1 wherein the catalyst is applied to a support member over which the effluent passes, and the support member has a form selected from the group consisting of granule, tablet, honeycomb, wire, ring, saddle and rod.

6. The method of claim 5 wherein the catalyst is mixed with water and an adhesive to form a film which is applied to the support member and then dried thereon.

7. The method of claim 6 wherein the support member has a honeycomb form.

8. The method of claim 7 wherein the support member has a ceramic honeycomb form.

9. The method of claim 6 wherein the catalytic effectiveness of the catalyst after deactivation by coal dust or other particulates is restored by applying a water wash or air blast thereto.

10. The method of claim 5 wherein the support member is wires compressed into sponge or pillow-like form.

11. The method of claim 1 wherein the reduction of the NOX and SOX takes place with a space velocity between 2000 to 20,000.

12. The method of claim 11 wherein the flue gas contains up to 1% NOX and up to 2% SOX.

13. The method of claim 12 wherein the effluent is mixed with an additional gas and passed over the catalyst.

14. The method of claim 11 wherein the reducing agent is a mixture of CO and hydrogen derived from steam, methane or hydrocarbon, and the flue gas being at a temperature or about 125° C. during oxygen removal.

15. The method of claim 1 wherein the oxygen reducing agent is hydrogen.

16. The method of claim 11 wherein the oxygen reducing agent is hydrogen derived from the electrolysis of water, and the flue gas being initially at a temperature of about 125° C. during oxygen removal.

17. The method of claim 1 wherein the catalyst is a spinel formed as a reaction product of divalent and trivalent oxides.

18. The method of claim 17 wherein the divalent oxides are selected from the group consisting of cobalt, nickel, copper, zinc and iron.

19. The method of claim 17 wherein the trivalent oxides are selected from the group consisting of chromium, aluminum, manganese and iron.

20. The method of claim 1 wherein the catalyst is an inverse spinel inter-reacted with titania or zirconia.

21. The method of claim 17 including inter-reacting titania or zirconia with the divalent and trivalent oxides to form an inverse spinel.

22. The method of claim 1 including mixing the catalyst with water and an adhesive selected from the group consisting of colloidal silica, ceria, colloids, and titanium esters to form a paint-like film when the mixture is applied and dried onto a smooth support surface.

23. The method of claim 1 wherein the calcining temperature is no greater than 500° C.

24. The method of claim 1 wherein the calcining temperature is no greater than 350° C.

25. The method of claim 1 wherein the calcining temperature is no greater than 650+ C.

* * * * *